INVENTOR.
SOLOMON L. STEWART

ATTORNEY

United States Patent Office 3,616,597
Patented Nov. 2, 1971

3,616,597
METHOD FOR TREATING AND PURIFYING AIR
Solomon L. Stewart, 4902 W. Bethany Home Road, Glendale, Ariz. 85301
Filed May 11, 1970, Ser. No. 36,072
Int. Cl. B01d 47/06, 53/14
U.S. Cl. 55—19      6 Claims

ABSTRACT OF THE DISCLOSURE

A method for treating and purifying air by means of a series of different spray treatments resulting in the residue from each spray treatment being delivered to a different sump tank.

BACKGROUND OF THE INVENTION

A large number of studies have been made to determnie the content of polluted air and it is well-known that sulfur oxide in the atmosphere reduces visibility, causes corrosion, destroys fabrics, damages vegetation, and causes an increase in cardio-respiratory disease in man. Vapors from the automobile crankcase and the emission of hydrocarbons and carbon monoxide from the automobile exhaust pipe further add to the air pollution problem. Further, air pollution occurs through the burning processes of industry together with that occurring from burning for waste disposal purposes.

FIELD OF THE INVENTION

This invention is particularly directed to a method for treating and purifying air wherein a series of spray treatments are provided for washing the air and delivering the resulting residue to various sump tanks.

DESCRIPTION OF THE PRIOR ART

At the present time dust collectors and sludge separators have been provided for cleaning dust-laden air with the assistance of a water spray, the resulting sludge being delivered to a sludge tank in which the sludge is separated from the water and the sludge-free water drained off to a sewer or the like. Sudden chilling or thermal shocking of waste gases by means of liquid nitrogen or another inert gas sprayed into an ascending stream of such waste gases rising against a descending water spray, and separating the ice crystals from the ascending stream of chilled waste gases and melting such ice crystals and draining out the water bearing the impurities have been known. None of the devices have been satisfactory for cleaning and purifying the air over large sections of a city or that entering a given building complex through its air conditioning system when it is desirable to remove gas pollution such as sulfur dioxide, carbon monoxide and the like air contaminators.

SUMMARY OF THE INVENTION

In accordance with the invention claimed a new and improved method of treating and purifying air has been provided. This apparatus and method employs the use of spray treatments of the air with the contents of the spray being sequentially varied resulting in the discharge of the air washed in a predetermined manner to eliminate or greatly reduce its contamination before being used in a given building complex or as a continuous filtering and cleaning process for the air blanket over a given area or areas of a city.

It is, therefore, one object of this invention to provide a new and improved method for treating and purifying air.

Another object of this invention is to provide a new and improved method for purifying air in which a plurality of different spray washes are provided to selectively remove given contaminates from the air and selectively treat the air.

A further object of this invention is to provide a method of selectively spray treating the air and recovering the spray to reuse the ingredients of the contaminated air.

A still further object of this invention is to provide a novel method for separating particulate matter from gas streams with marked efficiency, wide flexibility of operation and pronounced operating economy.

Further objects and advantages of this invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
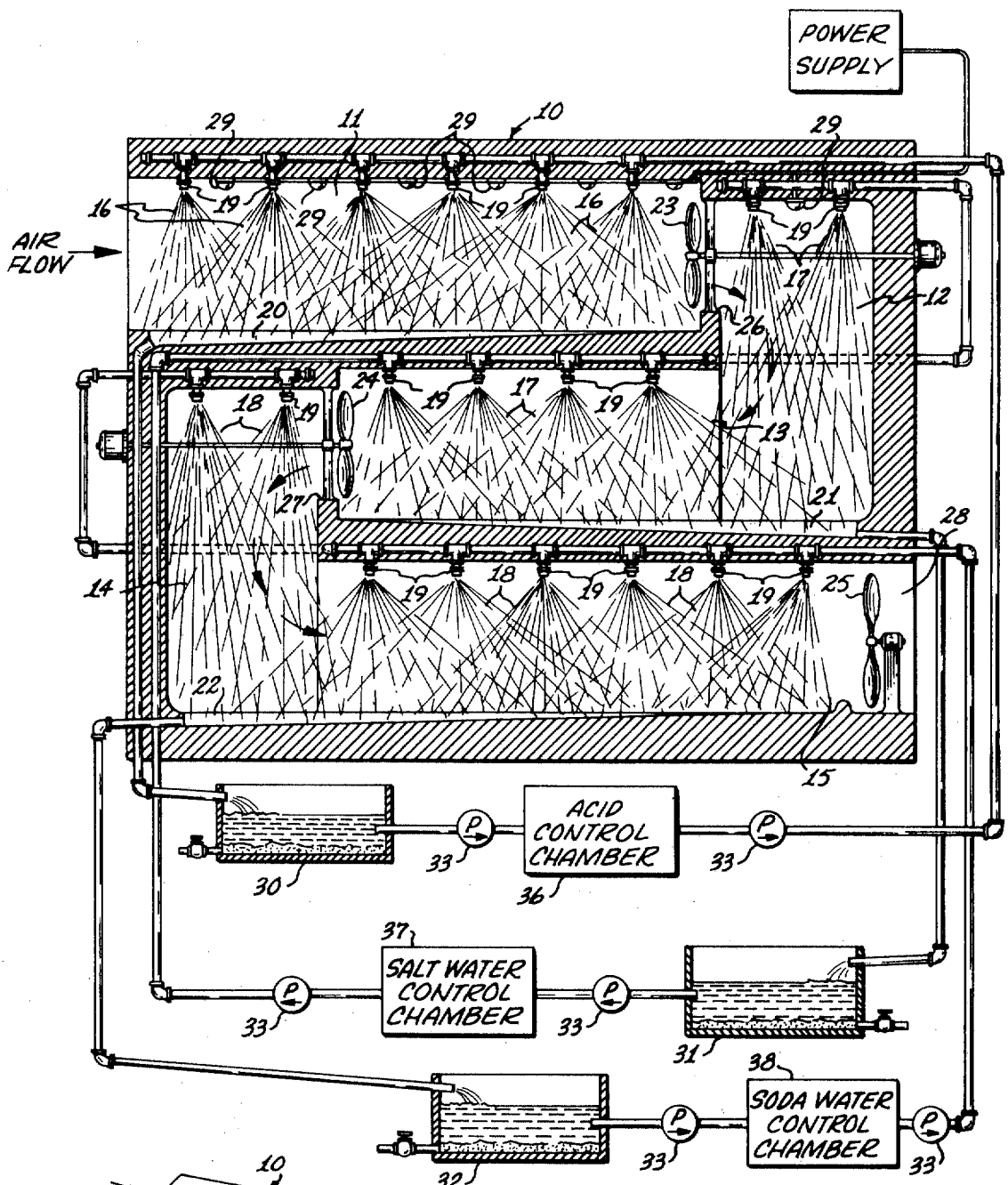
FIG. 1 is a view partly in side elevation and partly in section of an apparatus for treating and purifying air and embodying the invention.

Referring more particularly to the drawing by characters of reference, FIG. 1 discloses a gas such as air treatment and purifying device 10 which may be self-supporting or mounted on a structure such as the roof of a building and provides an air path or flow through the device. As shown in FIG. 1 the air path is tortuous so as to provide a compact unit, however, device 10 could provide a straight path through the unit without affecting the operation of the device.

Polluted air entering device 10 passes through a plurality of zones 11, 12, 13, 14 and 15. In all of the zones the air is washed by sprays 16, 17, and 18, respectively, of given chemical solutions. Each spray is produced by a suitable spray nozzle 19.

The liquid content of each spray not absorbed by the air passing through it is caught by suitable trays 20, 21, 22 for zones 11, 12 and 13, and 14 and 15, respectively. As noted from the drawing zones 12 and 14 drain any precipitate of the air into trays 21 and 22, respectively.

The air is drawn through each zone by suitable fans 23, 24 and 25 each arranged in an orifice 26, 27 and 28 at the downstream ends of zones 11, 13 and 15. Zones 11 and 12 are further provided with a plurality of ultraviolet lamps 29 for further purifying the air in a well-known manner.

As shown in the drawing each of the trays 20, 21 and 22 drains by gravity into its own sump tank 30, 31 and 32, respectively. The contents of the sump tanks 30, 31 and 32 are then pumped by pumps 33, through control chambers 36, 37 and 38 to the spray nozzles 19 in zones 11, 13 and 15, respectively.

Each control chamber according to the invention provides a different solution for spraying through the intake air in the respective zones. For example, the nozzles 19 in zone 11 are provided with a liquid spray having an acid consistency similar to the polluted air. The air contaminated by smelters or furnaces which expel sulfur oxides contain fine droplets of sulfuric acid in vapor form. When the air containing the droplets or vapor is washed by a liquid solution having the same ingredients the contamination in the air will cling to the water spray having the same ingredients and will be washed clean of them. The spray then drops into tray 20 where it drains by gravity into sump tank 30. It is then pumped into acid control chamber 36. The acid control chamber is intended to dilute or strengthen the acid liquid consistency depending on its acidity.

The nozzles 19 in zones 12 and 13 are fed liquid under pressure from sump tank 31 through salt water control chamber 37. The resulting salt water spray from nozzles 19 in zones 12 and 13 are intended to spray the air washed by the acid sprays of zone 11 to dissolve the salts in the air. These dissolved salts drop from the air with the liquid of the spray into tray 22 where it flows under gravity to sump tank 31. Pump 33 then pumps the liquid in sump tank 31 back to salt water control chamber 37 where its consistency is again checked and strengthened or weakened as the need requires.

The nozzles 19 in zones 14 and 15 are provided with soda water liquid from soda water control chamber 38 by pump 33 through suitable pipes in the same manner as the nozzles 19 in zones 11, 12 and 13.

The sodium hydroxide neutralizes the acid and salt water that might have remained in the air after the liquid spray treatment of zones 11, 12 and 13.

Figure 2:
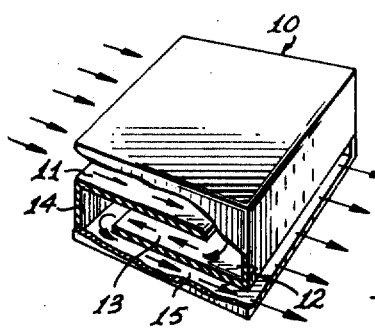
FIG. 2 is a perspective view partly broken away of the structure shown in FIG. 1.

FIG. 2 illustrates a perspective view of device 10 and showing the air flow through the device.

In accordance with the invention the air is washed sequentially in a given manner by sprays of a given consistency to treat and purify the air for smog removal and in turn health benefits.

Although but one embodiment of the present invention has been illustrated and described, it will be apparent to those skilled in the art that various changes and modifications may be made therein without departing from the spirit of the invention or from the scope of the appended claims.

What I claim is:

1. The method of purifying air which includes waste gases comprising the steps of moving the air through a given zone, spraying the air in said zone with an acid solution, draining the residue of said zone into a first sump, moving the air sequentially through a second zone, spraying the air in said second zone with a salt water solution, draining the residue of said second zone into a second sump, moving the air sequentially through a third zone, spraying the air in said third zone with a soda water solution, and draining the residue of said third zone into a third sump.

2. The method set forth in claim 1 wherein said acid solution comprises a sulfuric acid liquid.

3. The method set forth in claim 1 wherein each of the solutions are continuously recirculated and sprayed in their respective zones.

4. The method set forth in claim 1 in further combination with the method steps of subjecting the air in the first zone to ultraviolet rays.

5. The method set forth in claim 1 in further combination with the steps of checking and strengthening the respective solution of each spray if it fails to reach a given consistency.

6. The method set forth in claim 1 in further combination with the steps of checking and diluting the strength of the respective solution of each spray if it fails to reach a given consistency.

References Cited

UNITED STATES PATENTS 3,299,620   1/1967   Hollingworth _____ 55—279 X

REUBEN FRIEDMAN, Primary Examiner

R. W. BURKS, Assistant Examiner

U.S. Cl. X.R.

23—4; 55—94